(12) United States Patent
Hsieh et al.

(10) Patent No.: US 8,692,811 B2
(45) Date of Patent: Apr. 8, 2014

(54) DISPLAY DEVICE HAVING VIBRATION FUNCTION AND VIBRATION TYPE TOUCH-SENSING PANEL

(75) Inventors: Chia-Chin Hsieh, Hsin-Chu (TW); Jen-Lang Tung, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 386 days.

(21) Appl. No.: 13/114,125

(22) Filed: May 24, 2011

(65) Prior Publication Data

US 2011/0298758 A1 Dec. 8, 2011

(30) Foreign Application Priority Data

Jun. 4, 2010 (TW) .............................. 99118196 A

(51) Int. Cl.
*G06F 3/043* (2006.01)
(52) U.S. Cl.
USPC ............................ 345/177; 345/179; 345/156
(58) Field of Classification Search
USPC ..................... 345/156–183; 178/18.01–18.06
See application file for complete search history.

(56) References Cited

U.S. PATENT DOCUMENTS

| | | | |
|---|---|---|---|
| 7,336,266 B2 | 2/2008 | Hayward et al. | |
| 7,616,373 B2 * | 11/2009 | Soyama et al. | 359/296 |
| 2003/0184574 A1 | 10/2003 | Phillips et al. | |
| 2007/0063982 A1 | 3/2007 | Tran | |
| 2007/0229479 A1 * | 10/2007 | Choo et al. | 345/177 |
| 2010/0110022 A1 * | 5/2010 | Chen et al. | 345/173 |
| 2010/0123685 A1 * | 5/2010 | Lee et al. | 345/177 |

* cited by examiner

*Primary Examiner* — Andrew Sasinowski
(74) *Attorney, Agent, or Firm* — McClure, Qualey & Rodack, LLP

(57) ABSTRACT

A vibration type touch-sensing panel includes a substrate, a plurality of vibration units, and a control module, wherein the vibration units are disposed on the substrate to form a matrix. Each one of the vibration units includes a first electrode layer, a second electrode layer, and an electret layer, wherein the first electrode layer is disposed on the substrate. The electret layer is disposed between the first electrode layer and the second electrode layer and located on one of the first electrode layer and the second electrode layer. The control module provides a driving voltage between the first electrode layer and the second electrode layer so that the electret layer and one of the first electrode layer and the second electrode layer generate a relative vibration.

24 Claims, 14 Drawing Sheets

DISPLAY DEVICE HAVING VIBRATION FUNCTION AND VIBRATION TYPE TOUCH-SENSING PANEL

BACKGROUND OF THE INVENTION

1. Field of the Invention

The present invention relates to a touch-sensing panel and a touch-sensing display device and specifically to a vibration type touch-sensing panel and a vibration type touch-sensing display device.

2. Description of the Prior Art

Display panels having touch-sensing function are becoming more and more popular on the current market. The touch-sensing display panels are gradually integrated into consumer electronic products such as mobile communication devices, electronic books, and video game consoles for users to input command by touching the touch-sensing display panels. Furthermore, as more and more applications of the touch-sensing display panel are developed, application software or user may require the touch-sensing display panel to generate overall vibrations or local vibrations based on the context of use.

One of the conventional methods for the touch-sensing display panel to generate vibrations includes using electric motors or piezoelectrical materials as actuator to generate vibration, wherein the electric motor or the piezoelectrical material is coupled with the touch-sensing display panel to generate vibrations based on signals from the touch-sensing display panel. In this way, the touch-sensing display panel can be driven by the above-mentioned actuator to generate vibration. However, the method of generating vibration mentioned above can only drive the touch-sensing display panel to generate overall vibrations and not local vibrations and therefore cannot satisfy user's demand for local vibration.

Another conventional method for the touch-sensing display panel to generate vibration uses the piezoelectrical material as actuator to generate vibration. However, separate piezoelectrical materials are arranged into a matrix and each of the piezoelectrical materials corresponds to a different portion of the touch-sensing display panel. In addition, each piezoelectrical material receives the driving signal from the touch-sensing display panel and generates vibrations corresponding in amplitude to the driving signal. In this way, the touch-sensing display panel can drive all the piezoelectrical materials to generate overall vibrations or drive only a portion of the piezoelectrical materials to generate local vibrations. Experiments indicate that the minimum vibration intensity perceivable by human body is 30 μm. However, the conventional piezoelectrical material cannot generate vibration with intensity greater than 30 μm. For instance, the conventional piezoelectrical material named polyvinylidene fluoride (PVDF) can only generate vibration of 20 nm if a voltage of 100V is supplied. Another piezoelectrical material named lead-zirconate-titanate (PZT) can only generate vibration of 0.4 μm if a voltage of 100V is supplied. This shows that the current market needs a touch-sensing panel and a touch-sensing display device that can generate overall vibration or local vibration perceivable by human body.

SUMMARY OF THE INVENTION

It is an object of the present invention to provide a vibration type touch-sensing panel to selectively generate overall vibration or local vibration perceivable by human body.

It is another object of the present invention to provide a vibration type touch-sensing display device to display images, detect user's touch, and selectively generate overall vibration or local vibration perceivable by human body.

The present invention relates to a vibration type touch-sensing panel including a substrate, a plurality of vibration units, and a control module, wherein the vibration unit are disposed on the substrate to form a matrix. Each of the vibration units includes a first electrode layer, a second electrode layer, and an electret layer, wherein the first electrode layer is disposed on the substrate. The electret layer is disposed between the first electrode layer and the second electrode layer and located on one of the first electrode layer and the second electrode layer. The control module provides a driving voltage between the first electrode layer and the second electrode layer so that the electret layer and one of the first electrode layer and the second electrode layer can generate a relative vibration.

In different embodiments, a sensing unit is disposed on the second electrode layer or the first electrode layer and the second electrode layer together form a sensing unit to transmit a sensing signal to a sensing module based on user's touch. Furthermore, the vibration type touch-sensing panel further includes a switching unit electrically connected to the first electrode layer, the second electrode layer, the sensing module, and the control module, wherein the switching unit is used to receive a driving signal from the control module and transmit those the driving signal to the first electrode layer and the second electrode layer so that the electret layer can generate vibration. In addition, the switching unit can also receive sensing signals from the first electrode layer and the second electrode layer and transmit the sensing signals to the sensing module for determining user's touch.

The present invention also relates to a vibration type touch-sensing display device including the vibration type touch-sensing panel mentioned above. The vibration type touch-sensing display device includes a display substrate used as the substrate of the above-mentioned vibration type touch-sensing panel, but is not limited thereto. In different embodiments, the vibration type touch-sensing display device includes a backside substrate and a thin-film transistor layer, wherein the backside substrate is used as the substrate of the vibration type touch-sensing panel whereas the thin-film transistor layer is disposed on the backside substrate.

DETAILED DESCRIPTION OF THE PREFERRED EMBODIMENT

The present invention relates to a vibration type touch-sensing display device and a vibration type touch-sensing panel thereof. The vibration type touch-sensing panel includes a plurality of vibration units. The vibration type touch-sensing panel transmits driving voltages to different electrode layers of the vibration units to generate a relative vibration between the electrode layers and cause overall vibration of the vibration unit. In this way, the vibration type touch-sensing panel can drive different vibration units to generate vibration at different portions of the vibration type touch-sensing panel.

Figure 1:
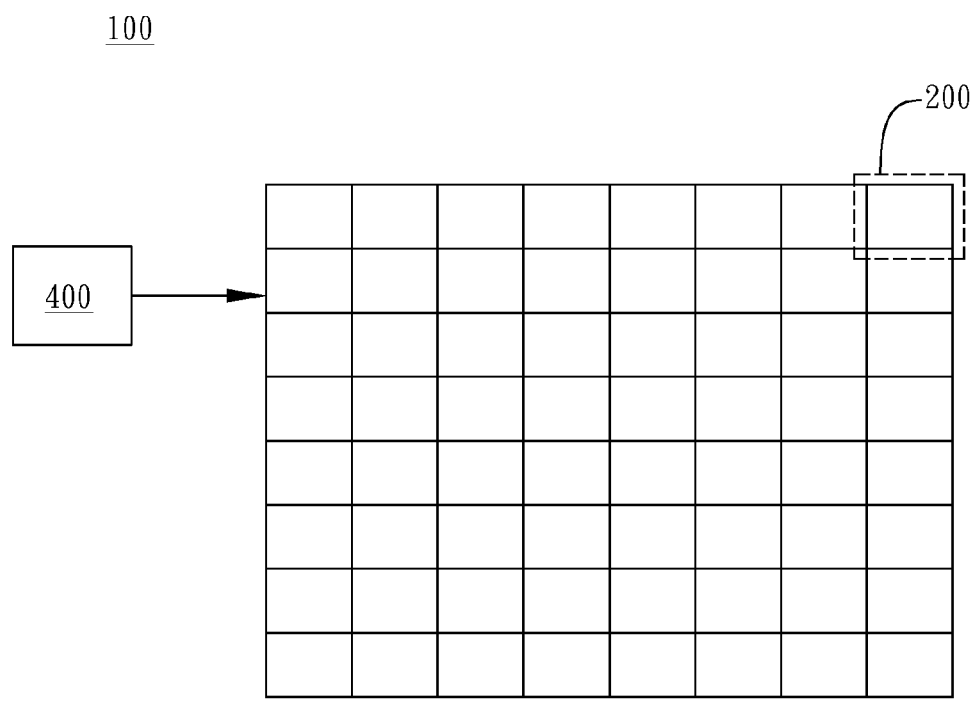
FIG. 1 is a top view of the vibration type touch-sensing panel of the present invention.

FIG. 1 is a top view of the vibration type touch-sensing panel 100 of the present invention. The vibration type touch-sensing panel 100 includes a plurality of vibration units 200, a substrate (not illustrated) and a control module 400, wherein the vibration units 200 are preferably disposed on the substrate. As FIG. 1 shows, the vibration units 200 are arranged in the form of a matrix. The control module 400 is electrically connected to each of the vibration units 200 and provides driving voltages to individual vibration units 200 in order to generate vibrations based on the user's command, wherein amplitudes of the driving voltages can differ based on the user's command. In this way, the control module 400 can drive the vibration units 200 to generate vibrations of same or different intensity.

Figure 2:
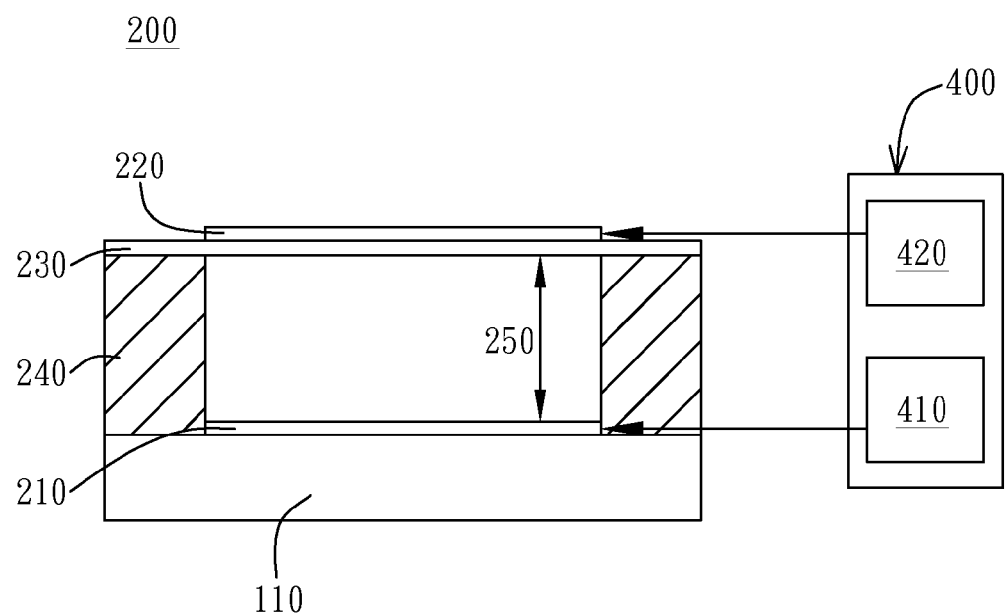
FIG. 2 is a cross-sectional view of the vibration units of FIG. 1.

FIG. 2 is a cross-sectional view of the vibration unit 200 of the embodiment illustrated in FIG. 1. As FIG. 2 shows, the vibration unit 200 includes a first electrode layer 210, a second electrode layer 220, an electret layer 230, and spacers 240. The first electrode layer 210 and the spacers 240 are disposed on the substrate 110, wherein the first electrode layer 210 is disposed between the spacers 240. The second electrode layer 220 is located above the spacers 240 and a spacing 250 exists between the first electrode layer 210 and the second electrode layer 220. Furthermore, in the present embodiment, the space between the first electrode layer 210 and the electret layer 230 is filled with air, but is not limited thereto; in different embodiments, the space between the first electrode layer 210 and the electret layer 230 can be filled with transparent dielectric materials or other suitable materials.

In the embodiment illustrated in FIG. 2, the control module 400 includes a first unit 410 and a second unit 420, wherein the first unit 410 and the second unit 420 of the present embodiment are electrically connected to the first electrode layer 210 and the second electrode layer 220, respectively. The first electrode layer 210 and the second electrode layer 220 are electrically connected to the first unit 410 and the second unit 420 of the control module, respectively, wherein the first unit 410 and the second unit 420 create an alternating current voltage or a direct current voltage between the first electrode layer 210 and the second electrode layer 220 in order to create an electric field between the first electrode layer 210 and the second electrode layer 220. The electret layer 230 will deform due to compressions and expansions induced in a direction perpendicular to the second electrode layer 220, based on the polarity of the above-mentioned alternating current voltage or the direct current voltage. In other words, the alternating current voltage or the direct current voltage provided by the control module 400 is used as a driving voltage which causes the electret layer 230 to expand or compress in its normal direction, based on the alternating current voltage or direct current voltage between the two electrode layers 210, 220, so that a relative vibration between the first electrode layer 210 and the electret layer 230 can be generated.

In the present embodiment, two ends of spacer 240 are connected to the substrate 110 and the electret layer 230 respectively using adhesives or other methods. In this way, the spacer 240 can transmit a portion of the kinetic energy generated by the electret layer 230 to the substrate 110 through the connection between the substrate 110 and the electret layer 230 and also fix the distance between the first electrode layer 210 and the electret layer 230. In different embodiments, the spacer 240 can be fastened to the substrate 110 and movably connected to the electret layer 230. In this way, the spacer 240 can define the spacing 250 and substantially maintain the relative position of the first electrode layer 210 and the electret layer 230. Alternatively, the spacer 240 can be fastened to the electret layer 230 and movably connected to the substrate 110. That is, one end of the spacer 240 can be fastened and the other end of the spacer 240 can be a free end that movably contacts the substrate 240 or the electret layer 230.

In the embodiment illustrated in FIG. 2, the material of the electret layer 230 is fluorinated ethylene propylene (FEP) and is not limited thereto; in different embodiments, the material of the electret layer 230 can include other transparent material. Furthermore, the thickness of the electret layer 230 in the present embodiment is substantially 50 μm, but is not limited thereto; in different embodiments, the thickness of the electret layer 230 can be adjusted between several nanometers and several micrometers based on design requirements such as the characteristics of the electret layer 230 or the overall structure strength of the vibration unit 200.

Figure 3A:
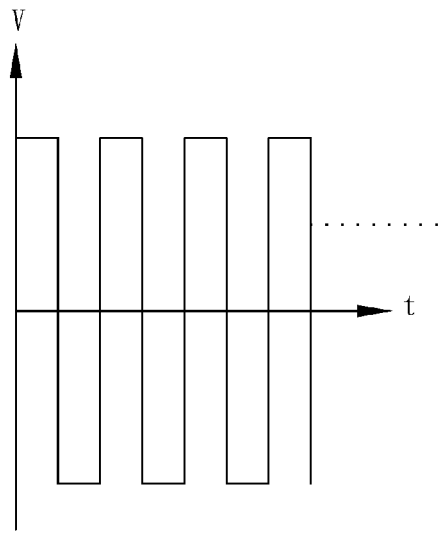
FIG. 3A, FIG. 3B, FIG. 3C, and FIG. 3D are oscillograms of the driving voltage for driving the electret layer to generate vibrations.
Figure 3B:
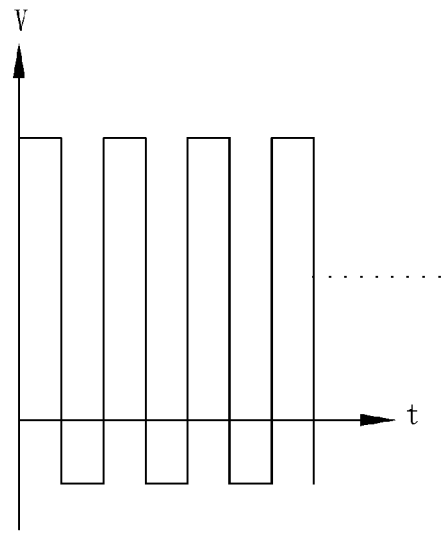

FIG. 3A and FIG. 3B are oscillograms of the driving voltage for generating vibration in the electret layer 230 of the present invention, wherein the driving voltage and the amplitude of vibration generated basically have the same waveform. The driving voltages illustrated in FIG. 3A and FIG. 3B are square waves in a form of alternating current voltage, wherein the square wave in FIG. 3B has a voltage offset, but is not limited thereto; in different embodiments, the driving voltage of the present invention includes sine wave, triangle wave, sawtooth wave and other voltage signals having frequency component and wave width.

Figure 3C:
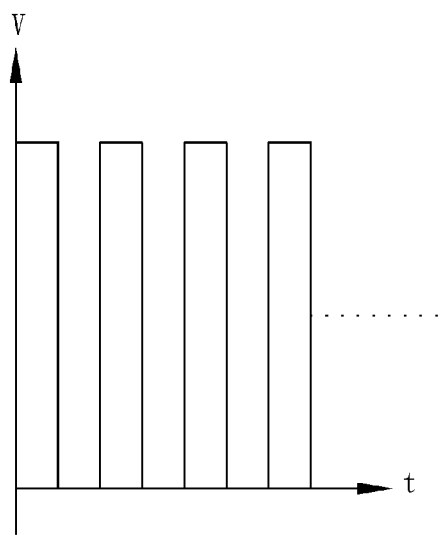
Figure 3D:
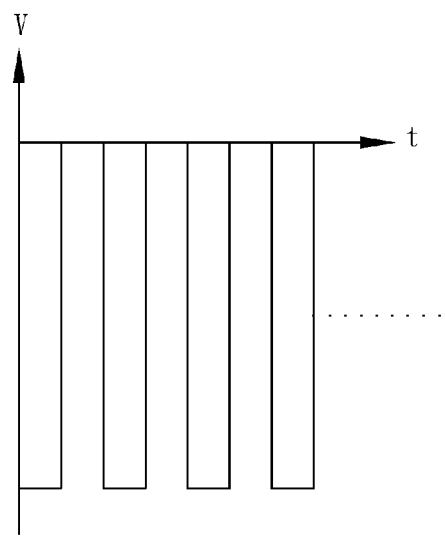

FIG. 3C and FIG. 3D are oscillograms of the driving voltage in different embodiments of the present invention. The driving voltages in FIG. 3C and FIG. 3D are electrical pulses in the direct current form, wherein the polarities of the electrical pulses in FIG. 3C and FIG. 3D are inverted relative to each other. Each of the driving voltages illustrated in FIG. 3C and FIG. 3D has a 50% duty cycle, but are not limited thereto.

Figure 4A:
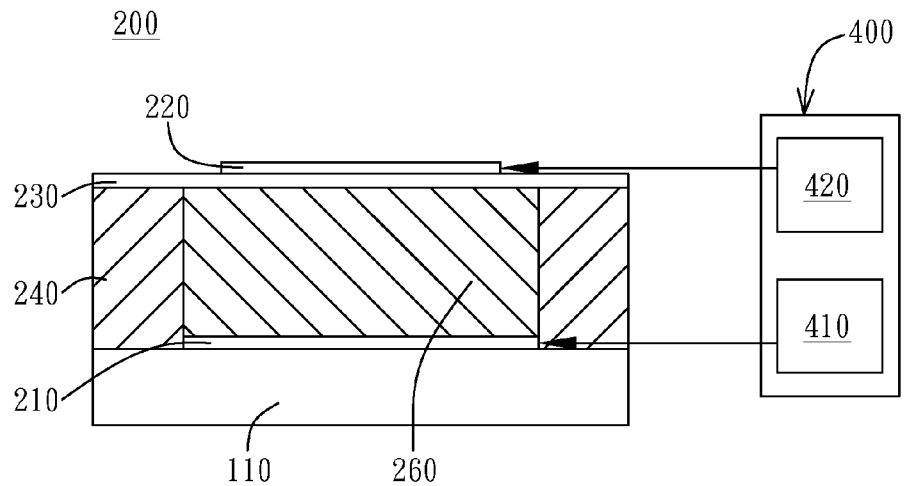
FIG. 4A and FIG. 4B are a cross-sectional view and an exploded view of the vibration unit in a variation embodiment.
Figure 4B:
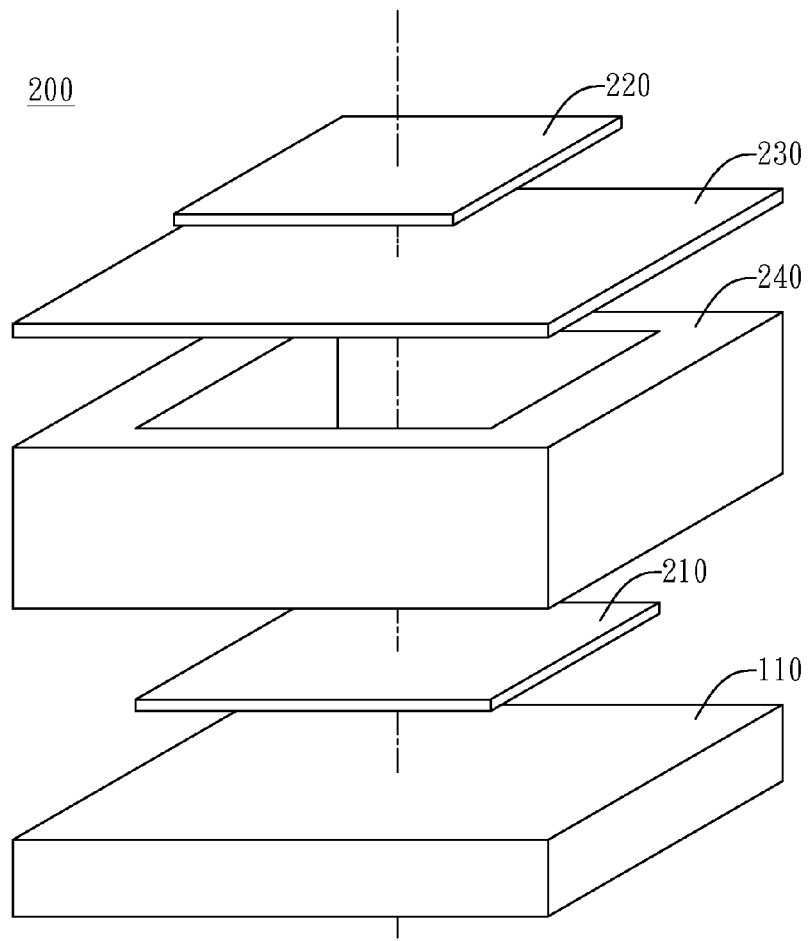
Figure 4C:
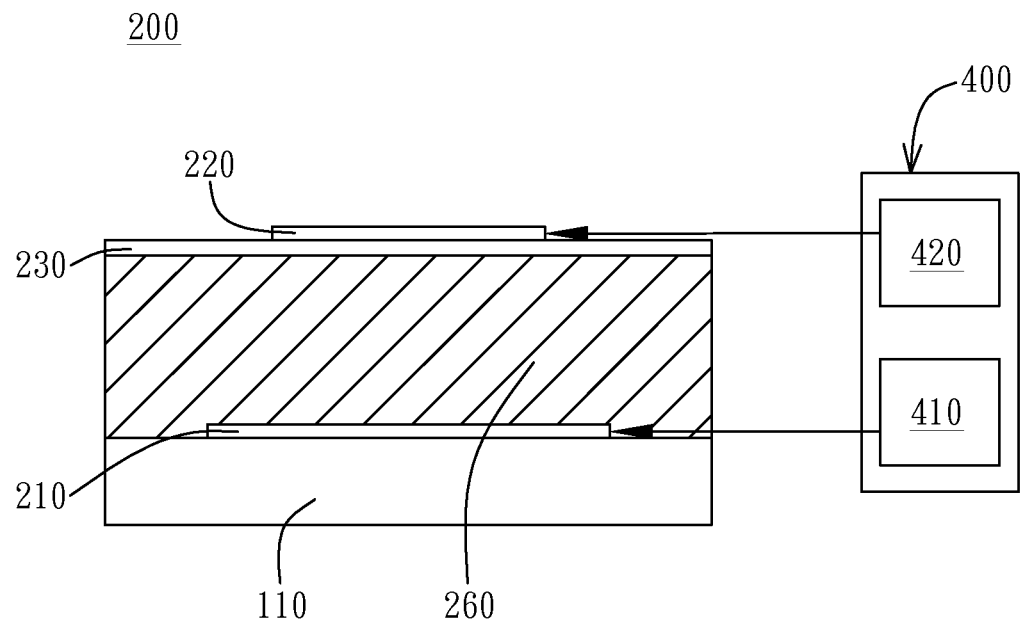
FIG. 4C is a cross-sectional view of the vibration unit in yet another variation embodiment.

FIG. 4A and FIG. 4B are a cross-sectional view and an exploded view of the vibration unit 200 in a variation embodiment of the present invention. In the embodiment illustrated in FIG. 2, the first electrode layer 210 and the second electrode layer 220 have substantially the same thickness and the same area. However, as FIG. 4A and FIG. 4B show, the area of second electrode layer 220 is smaller than the area of first electrode layer 210 and thus the material cost for the second electrode layer 220 can be reduced. Furthermore, the vibration unit 200 illustrated in FIG. 4A further includes a translucent filler layer 260 to increase the overall elasticity of the vibration unit 200. The translucent filler layer 260 of the present embodiment is disposed between the first electrode layer 210 and the electret layer 230 and fills the space enclosed by the first electrode layer 210, the electret layer 230, and the spacer 240, but is not limited thereto. In the embodiment illustrated in FIG. 4C, the translucent filler layer 260 can be disposed between the first electrode layer 210 and the electret layer 230 to replace the spacer 240.

Figure 5A:
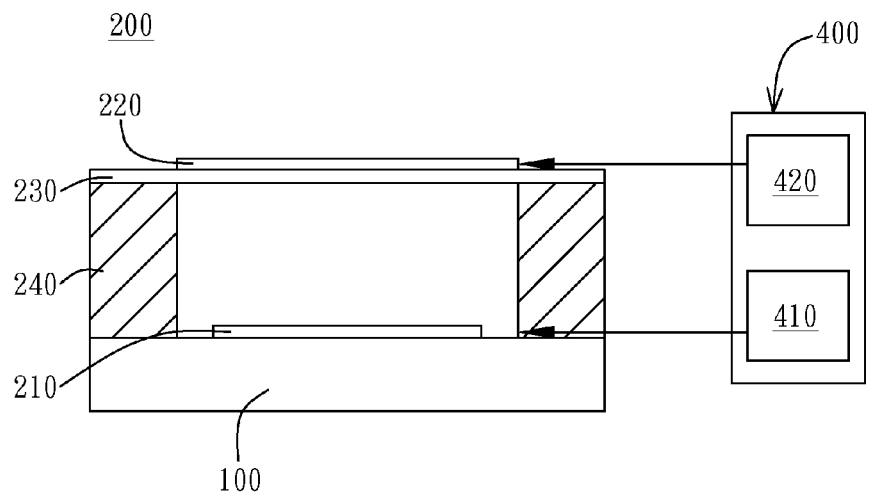
FIG. 5A and FIG. 5B illustrate a variation of the vibration unit illustrated in FIG. 4A and FIG. 4B.
Figure 5B:
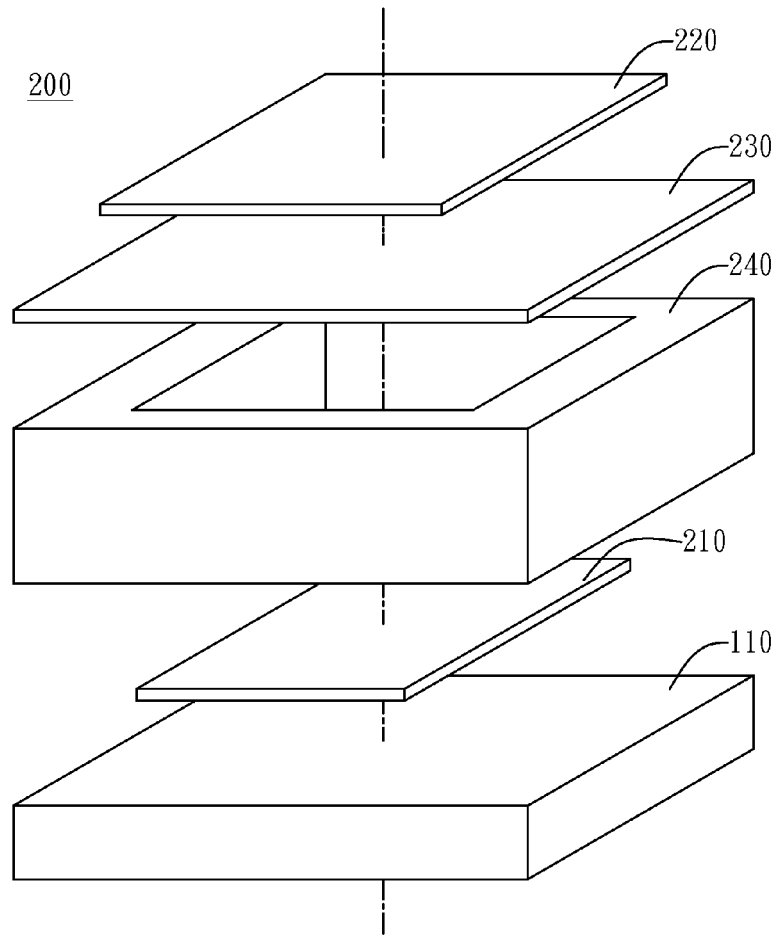

Here, please refer to the variation embodiment illustrated in FIG. 5A and FIG. 5B, wherein the area of the first electrode layer 210 is smaller than the area of the second electrode layer 220 to reduce the manufacture cost for the first electrode layer 210. Except the difference in area between the two electrode layers, the general structure of the vibration unit 200 illustrated in FIG. 5A and FIG. 5B are substantially identical to that of the vibration unit 200 illustrated in FIG. 4A and FIG. 4B and thus are not elaborated here.

Figure 6A:
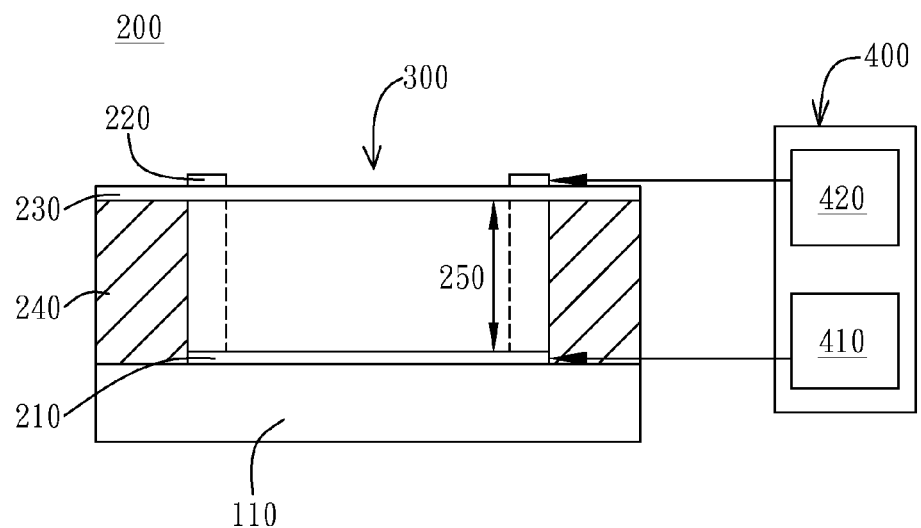
FIG. 6A and FIG. 6B are a cross-sectional view and an exploded view of the vibration unit in another embodiment of the present invention.
Figure 6B:
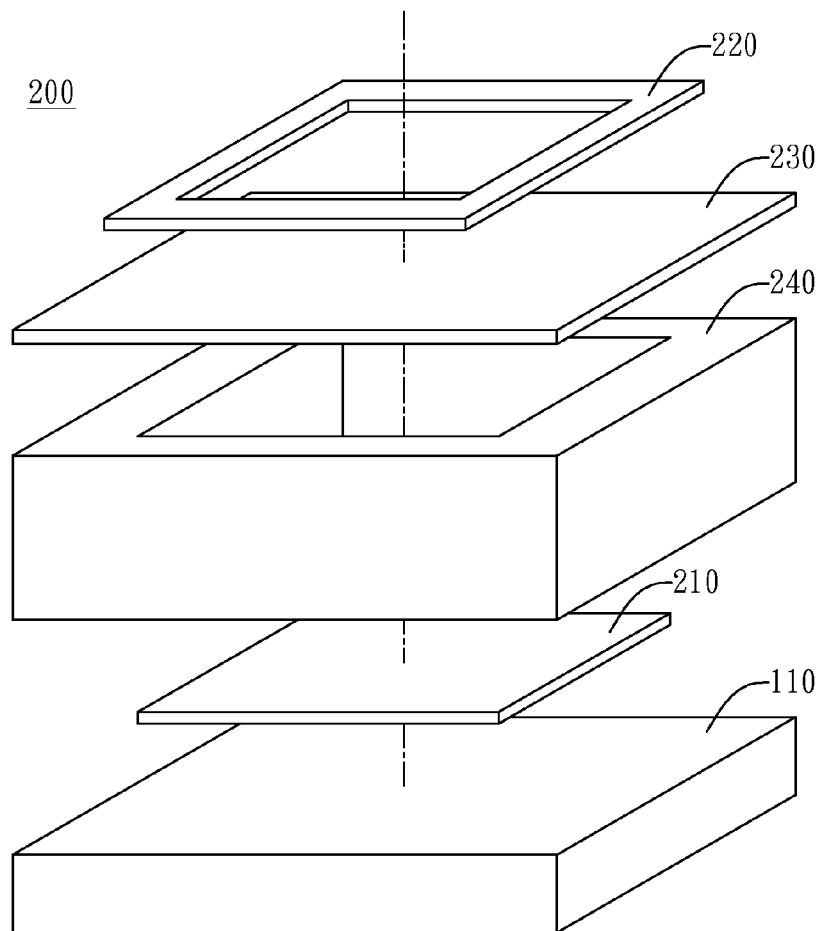
Figure 7A:
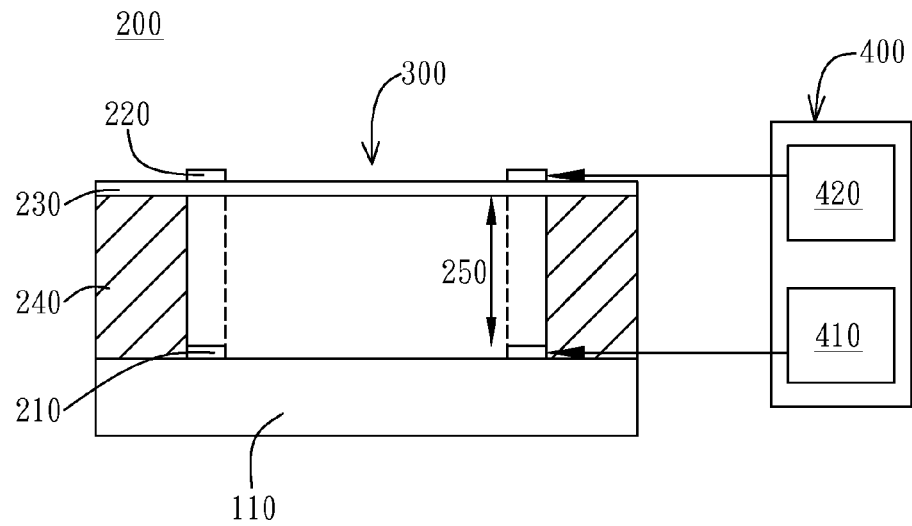
FIG. 7A and FIG. 7B illustrate a variation of the vibration unit illustrated in FIG. 6A and FIG. 6B.
Figure 7B:
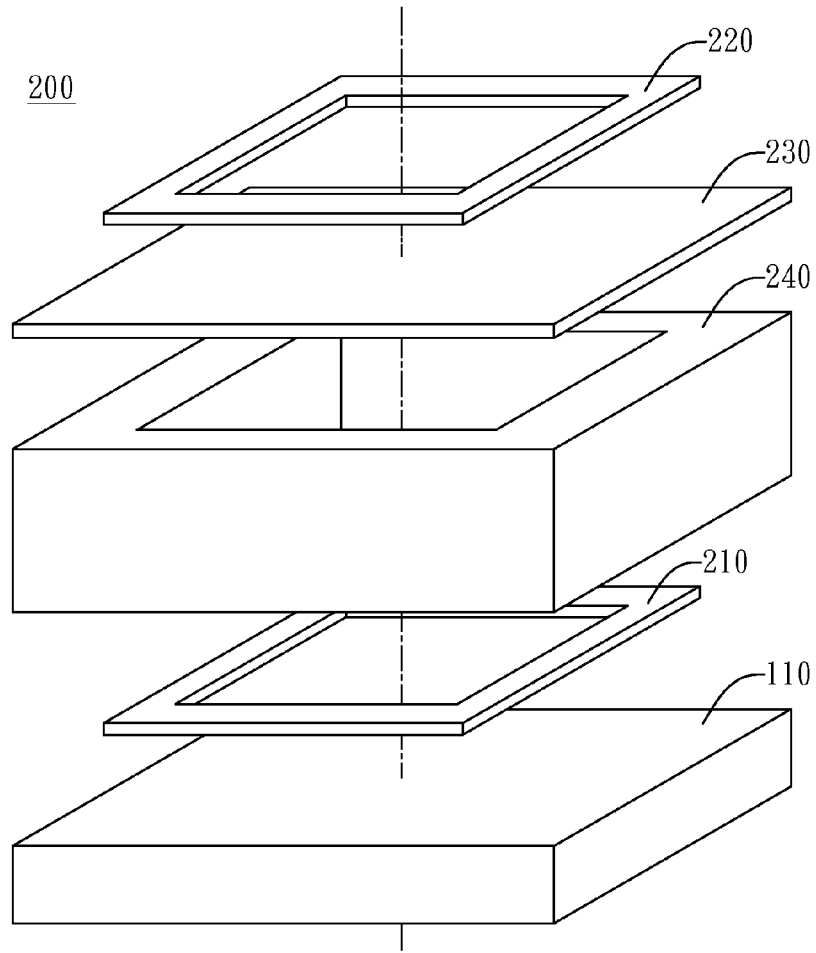

FIG. 6A and FIG. 6B are a cross-sectional view and an exploded view of the vibration unit 200 in another embodiment of the present invention. In the present embodiment, the second electrode layer 220 is an electrode frame disposed on the electret layer 230. Furthermore, the opening of the second electrode layer 220 defines a rectangular region above the electret layer 230. In the present embodiment, the first electrode layer 210 is an electrode disk and the second electrode layer 220 is an electrode frame. In this way, a rectangular region 300 is formed above the second electrode layer 220 to increase the overall translucence of the vibration unit 200. In different embodiments, the first electrode layer 210 and the second electrode layer 220 can be an electrode frame and an electrode disk, respectively. Furthermore, in the variation embodiment illustrated in FIG. 7A and FIG. 7B, the first electrode layer 210 and the second electrode layer 220 are both electrode frames disposed on the substrate 110 and the electret layer 230, respectively.

Figure 8:
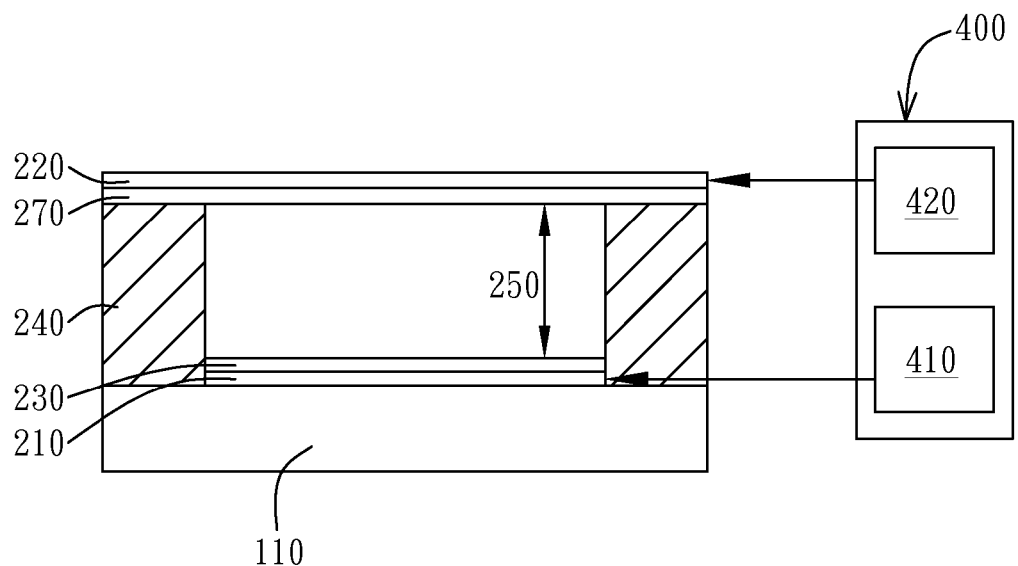
FIG. 8 is a cross-sectional view illustrating a variation of the vibration unit illustrated in FIG. 4A and FIG. 4B.

FIG. 8 is a cross-sectional view illustrating a variation of the vibration unit 200 illustrated in FIG. 4A and FIG. 4B. In the present embodiment, the vibration unit 200 further includes a transparent film 270, wherein the second electrode layer 220 is disposed on one side of the transparent film 270 facing away from the first electrode layer 210. In other words, the electret layer 230 is located between the first electrode layer 210 and the second electrode layer 220. In this embodiment, the electret layer 230 is disposed on the first electrode layer 210 and spaced apart from the second electrode layer 220.

As FIG. 8 shows, the control module 400 provides an alternating current voltage or a direct current voltage between the first electrode layer 210 and the second electrode layer 220 so that the electret layer 230 and one of the first electrode layer 210 and the second electrode layer 220 to which the electret layer 230 is attached can generate a relative vibration. However, in the embodiment illustrated in FIG. 8, the transparent film 270 generates vibrations similar to those generated by the electret layer 230 in FIG. 4A and FIG. 4B due to compressions and expansions incurred in the direction perpendicular to the first electrode layer 210. In addition, the vibration generated by the transparent film 270 causes the second electrode layer 220 to generate vibrations relative to the first electrode layer 210. In the present embodiment, the transparent film 270 serving as the substrate of the second electrode layer 220 is made of polyethylene terephthalate, but is not limited thereto. On the other hand, second electrode layer 220 may include zinc oxide added with aluminum, indium oxide, indium tin oxide, metal oxide ink or other suitable materials.

Two ends of the spacer 240 of the present embodiment are connected to the substrate 110 and the transparent film 270, respectively. In this way, the spacer 240 can transmit a portion of the kinetic energy generated by the transparent film 270 to the substrate 110 and fix the location of the transparent film 270 relative to the second electrode layer 220. In different embodiments, the spacer 240 can be connected only to the substrate 110 and movably connected to the transparent film 270 or connected only to the transparent film 270 and movably connected to the substrate 110. As such, the spacer 240 is used only to define the spacing 250 and substantially maintain the relative position of the second electrode layer 220 and the electret layer 230. That is, one end of the spacer 240 can be fastened and the other end of the spacer 240 can be a free end that movably contacts the substrate 240 or the transparent film 270.

Figure 9:
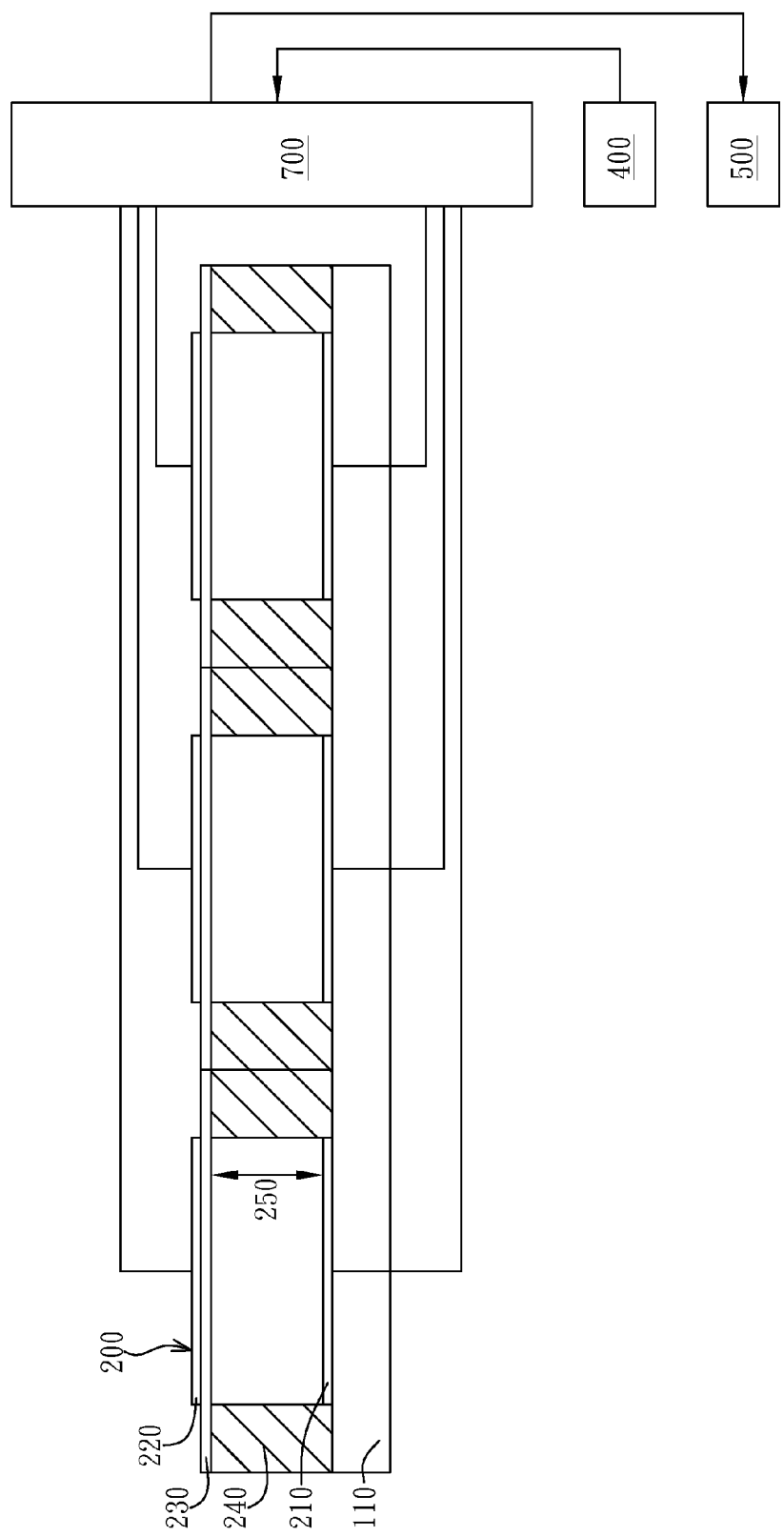
FIG. 9 is a cross-sectional view illustrating yet another variation of the vibration unit illustrated in FIG. 4A and FIG. 4B.

FIG. 9 illustrates another variation of the vibration unit 200 illustrated in FIG. 4A and FIG. 4B, wherein the vibration unit 200 of the present embodiment has functions of touch-sensing and generating vibration. As FIG. 9 shows, the first electrode layers 210 and the second electrode layers 220 of the vibration units 200 are electrically connected to a sensing module 500 via a switching unit 700. The first electrode layer 210 and the second electrode layer 220 together form a sensing unit for sensing user's touch and therefore each of the vibration units 200 has a sensing unit. When the second electrode layer 220 is touched by the user, the user's touch will change the voltage between the first electrode layer 210 and the second electrode layer 220 and this change in voltage will be transformed into a sensing signal to be transmitted to the sensing module 500. The sensing module 500 detects the voltage change between the electrode layers 210, 220 based on the received sensing signal and determines whether the second electrode layer 220 is touched by the user. In the present embodiment, the sensing unit formed by the first electrode layer 210 and the second electrode layer 220 is a capacitive type sensing unit, but is not limited thereto.

In the embodiment illustrated in FIG. 9, the switching unit 700 accepts sensing signals from the first electrode layers 210 and the second electrode layers 220 and transmits the sensing signals to the sensing module 500 for the sensing module 500 to determine user's touch. Furthermore, the switching unit 700 can also receive the driving voltages from the control module 400 and provide the driving voltages to the first electrode layers 210 and the second electrode layers 220 in order to drive the electret layers 230 to generate vibrations. In other words, the sensing signals and the driving voltages are transmitted between the first electrode layers 210, the second electrode layers 220, the control module 400, and the sensing module 500 via the switching unit 700. The switching unit 700 of the present embodiment is a multiplexer, but is not limited thereto; in different embodiments, the switching unit 700 can include other types of signal switching devices.

Figure 10:
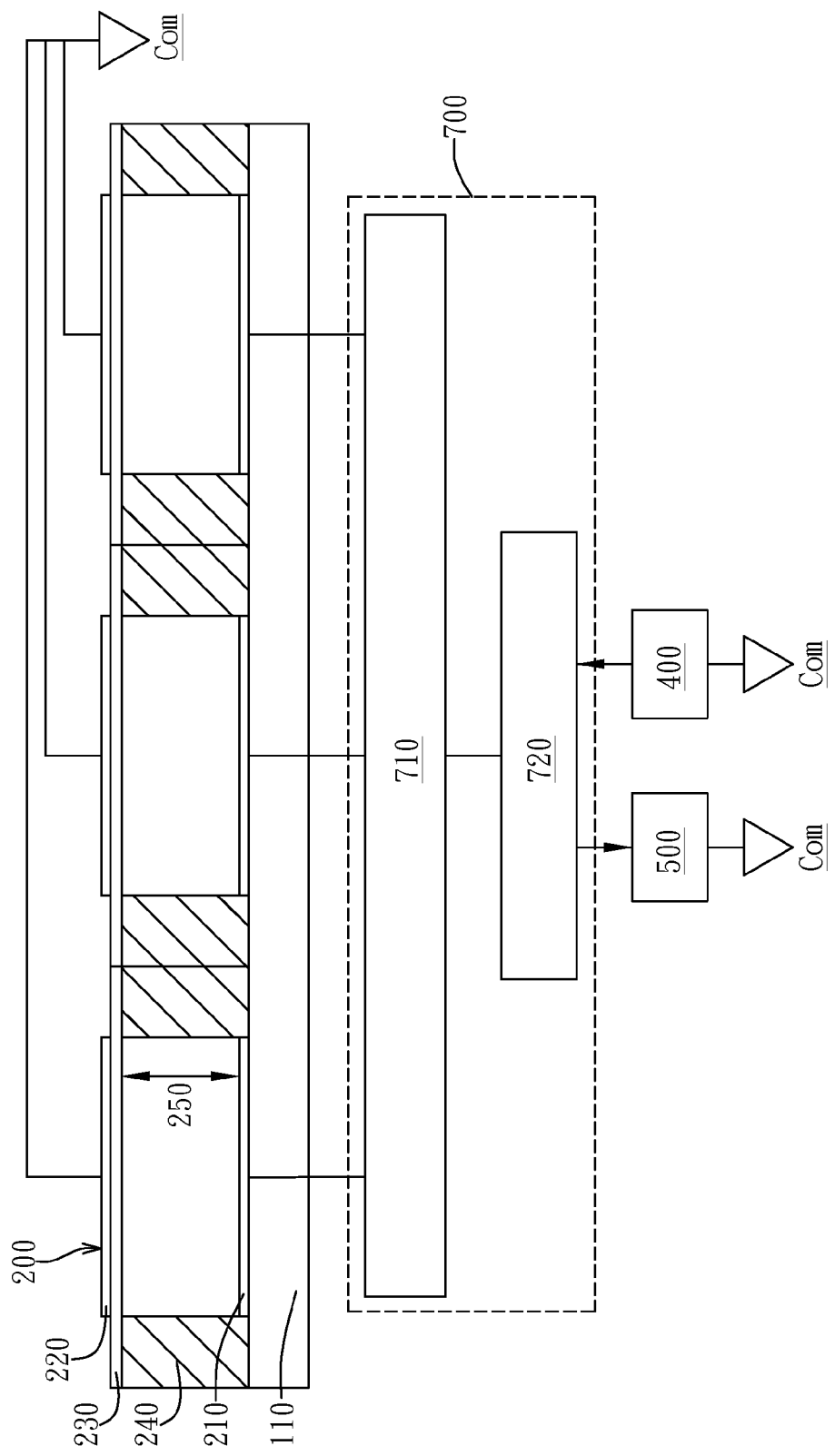
FIG. 10 illustrates a variation of the vibration unit illustrated in FIG. 9.

FIG. 10 illustrates a variation of the vibration unit 200 illustrated in FIG. 9, wherein the switching unit 700 includes a multiplexer 710 and a signal switch 720. In the present embodiment, the second electrode layers 220 are all connected to the same voltage level and form a biased electrode layer with same voltage reference. The control module 400 of the present embodiment and the sensing module 500 are also connected to ground and therefore the reference voltage of both the control module 400 and the sensing module 500 are identical to that of the second electrode layer 220. In this way, the control module 400 only needs to be electrically connected to the first electrode layer 210 to provide the driving voltage between the electrode layers 210, 220 and drive the electret layer 230 to generate vibrations. Similarly, the sensing module 500 only needs to be electrically connected to the first electrode layer 210 to detect the sensing signal from the electrode layers 210, 220 and determine user's touch.

Figure 11:
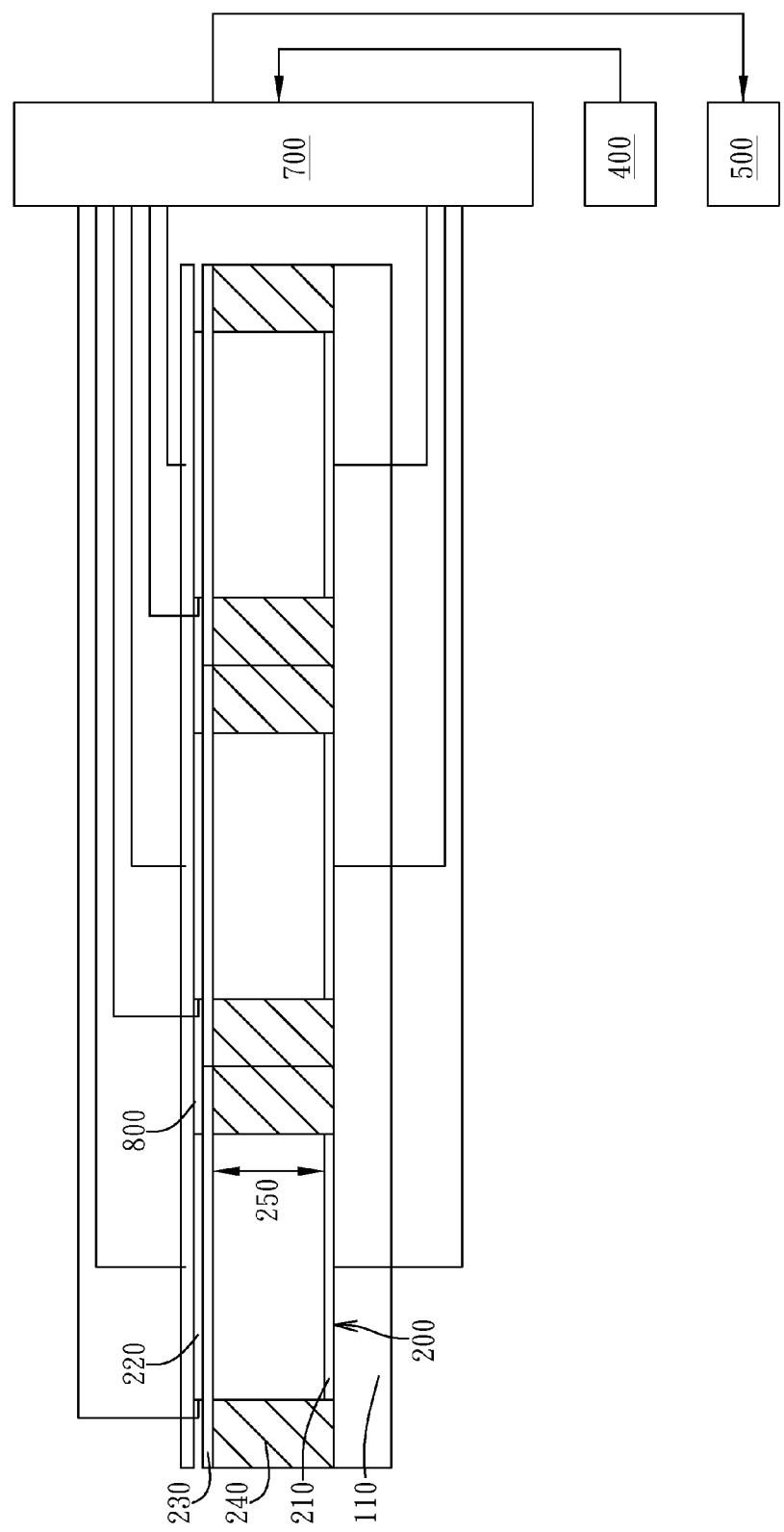
FIG. 11 is a cross-sectional view illustrating a variation of the vibration unit illustrated in FIG. 9.

FIG. 11 is a cross-sectional view illustrating a variation of the vibration unit 200 illustrated in FIG. 9. The sensing module 500 of the present embodiment includes a sensing unit 800 disposed on the second electrode layer 220, wherein the sensing unit 800 of the present embodiment is disposed above the first electrode layer 210 and covers the first electrode layer 210. As FIG. 11 shows, the first electrode layer 210 and the sensing unit 800 together form a capacitive type sensing unit, wherein the first electrode layer 210 and the sensing unit 800 are both electrically connected to the sensing module 500. In this way, when user touches the sensing unit 800 and changes the voltage between the first electrode layer 210 and the sensing unit 800, the change in voltage will be transformed into a sensing signal which is then sent to the sensing module 500. The sensing module 500 will determine user's touch on the sensing unit 800 based on the source of corresponding sensing signal.

Figure 12:
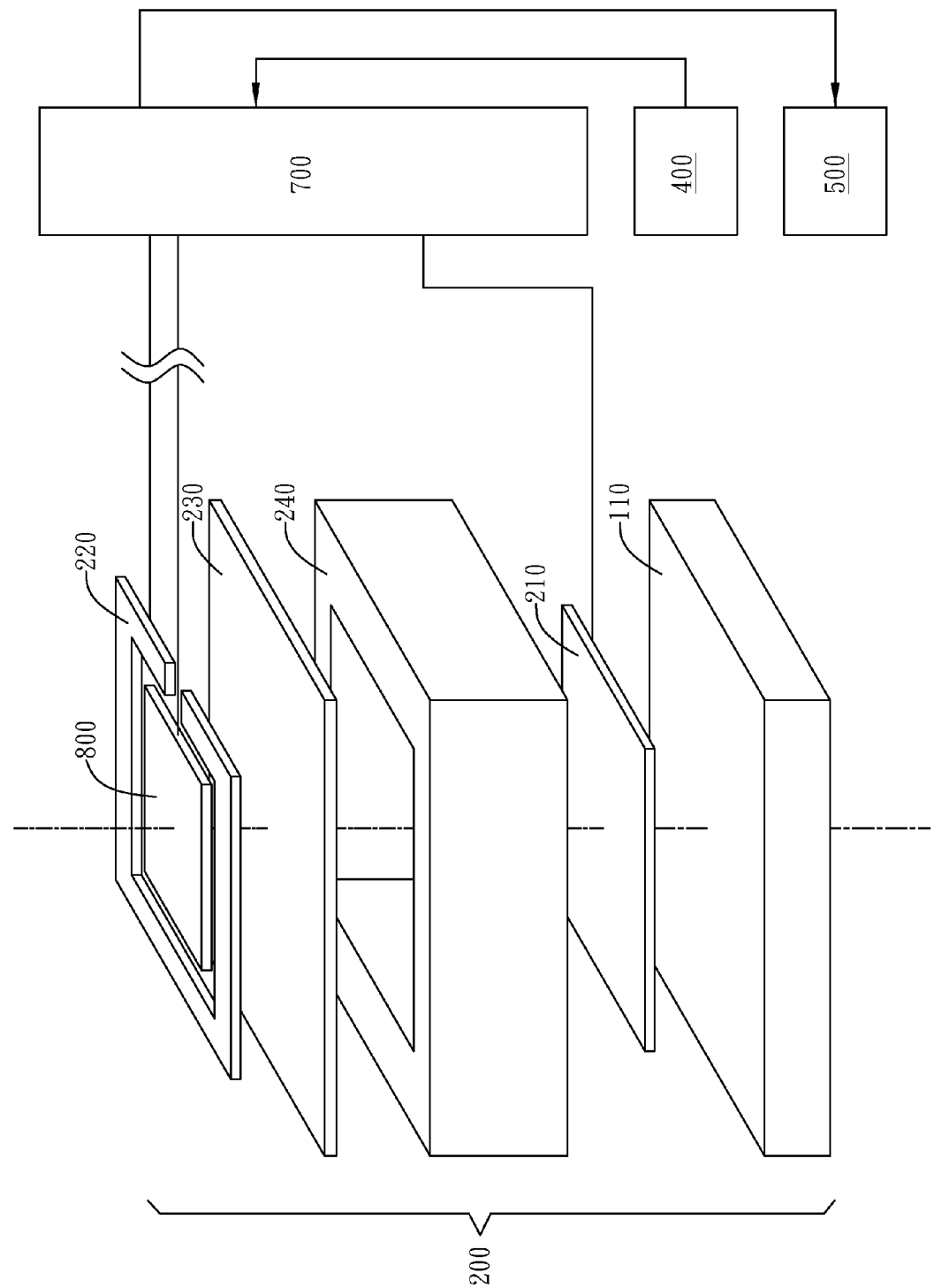
FIG. 12 illustrates yet another variation of the vibration unit illustrated in FIG. 11.

FIG. 12 illustrates yet another variation of the vibration unit 200 illustrated in FIG. 11. As FIG. 12 shows, the second electrode layer 220 is an electrode frame substantially surrounding the rectangular sensing unit 800. In addition, shapes of both the second electrode layer 220 and the sensing unit 800 are interchangeable, i.e. the sensing unit 800 can be a frame surrounding the rectangular second electrode layer 220, wherein the ratio of area between the second electrode layer 220 and the sensing unit 800 can be adjusted based on the amplitude of vibration required, the minimum area for sensing a touch, or other factors. In the present embodiment, the first electrode layer 210 and the sensing unit 800 together form a capacitive sensing unit electrically connected to the sensing module 500, wherein the working principle of the sensing unit is identical to the sensing unit 800 illustrated in FIG. 11, but is not limited thereto. In different embodiments, the electret layer 230 can be disposed above the second electrode layer 220 while a sensing unit 800 is disposed on a surface of the second electrode layer 220 and faces the first electrode 210 to form a resistive sensing unit. In this way, user can press the second electrode layer 220 to make contact with the first electrode layer 210 in order to generate a voltage drop between the two electrode layers 210, 220 and a corresponding sensing signal. The sensing module 500 electrically connected to the first electrode layer 210 and the second electrode layer 220 will detect the voltage drop and transmit this information to a backend processor in order to calculate the location of the sensing unit touched by user.

Figure 13:
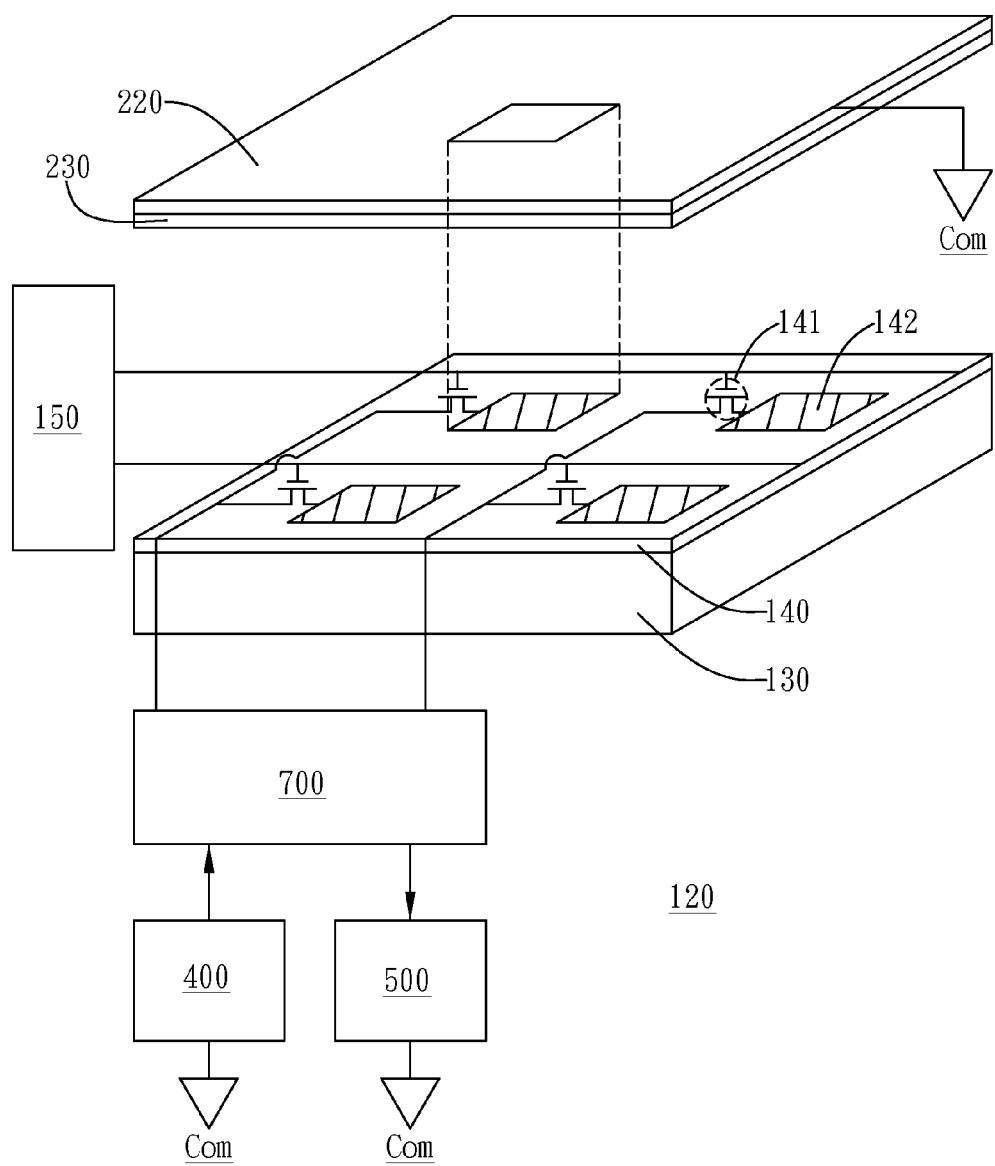
FIG. 13 is an exploded view of the vibration type touch-sensing display device of the present invention.

FIG. 13 is an exploded view of the vibration type touch-sensing display device 120 of the present invention. The vibration type touch-sensing display device 120 in the present embodiment includes a display substrate 130, a thin-film transistor layer 140, a gate driving module 150, a control module 400, a sensing module 500, and a switching unit 700, wherein the thin-film transistor layer 140 is disposed on the display substrate 130. As FIG. 13 shows, the thin-film transistor layer 140 includes a plurality of thin-film transistors 141 and a plurality of panel electrodes 142, wherein each of the thin-film transistors 141 corresponds to one panel electrode 142. The gate and source of each thin-film transistor 141 are electrically connected to the gate driving module 150 and a source driving module (not illustrated), respectively. The thin-film transistor 141 conducts when its gate receives a signal from the gate driving module 150 so that the panel electrode 142 can establish a signal connection with the control module 400 and the sensing module 500 via the source of the thin-film transistor 141.

The panel electrode 142 of the present embodiment is electrically connected to the control module 400 and the sensing module 500 via the switching unit 700. Furthermore, the second electrode layer 220 is connected to a common voltage level and forms a biased electrode layer having the same voltage, wherein the second electrode layer 220 is disposed on one side of the electret layer 230 facing away from the thin-film transistor layer 140. In this way, the control module 400 only needs to be electrically connected to the panel electrode 142 to provide driving signals to the panel electrodes 142 and the second electrode layers 220 for driving the electret layers on the second electrode layers 220 to generate vibrations. Similarly, the sensing module 500 only needs to be electrically connected to the panel electrode 142 to detect sensing signals outputted from the panel electrode 142 and the second electrode layer 220 and determine user's touch based on the sensing signal. In other words, the panel electrode 142 of the present embodiment has the functionality of the first electrode layer 210 of the vibration type touch-sensing panel 100 described above. Furthermore, the panel electrode 142 of the present embodiment corresponds to liquid crystal in a liquid crystal layer (not illustrated), wherein the panel electrode 142 is electrically connected to a pixel data module (not illustrated) via the thin-film transistor 141 to receive pixel data and control the rotation of liquid crystal in order to control the amount of light passing through the liquid crystal, but is not limited thereto; in different embodiments, the panel electrode 142 can establish signal connections with the control module 400 and the sensing module 500 for the transmission of driving signal and sensing signal therebetween.

The above is a detailed description of the particular embodiment of the invention which is not intended to limit the invention to the embodiment described. It is recognized that modifications within the scope of the invention will occur to a person skilled in the art. Such modifications and equivalents of the invention are intended for inclusion within the scope of this invention.

What is claimed is:

1. A vibration type touch-sensing panel, comprising:
   a substrate having an inner surface; and
   a plurality of vibration units disposed on the inner surface of the substrate to form a matrix, each of the vibration units includes:
   a first electrode layer disposed on the inner surface;
   a second electrode layer corresponding to the first electrode layer; and
   an electret layer disposed between the first electrode layer and the second electrode layer and located on one of the first electrode layer and the second electrode layer, wherein a spacing exists between the electret layer and the other one of the first electrode layer and the second electrode layer; and
   a control module for providing a driving voltage between the first electrode layer and the second electrode layer so that the electret layer and one of the first electrode layer and the second electrode layer generate a relative vibration.

2. The vibration type touch-sensing panel of claim 1, wherein the second electrode layer is disposed on the electret layer and spaced apart from the first electrode layer, the control module provides the driving voltage to generate a vibration in the electret layer.

3. The vibration type touch-sensing panel of claim 2, wherein a material of the electret layer includes fluorinated ethylene propylene (FEP) or other electret materials.

4. The vibration type touch-sensing panel of claim 2, each vibration unit further includes a spacer disposed between the electret layer and the substrate, wherein two ends of the spacer are connected to the electret layer and the substrate, respectively.

5. The vibration type touch-sensing panel of claim 2, each vibration unit further includes a spacer disposed between the electret layer and the substrate, wherein the spacer is fixedly connected to only one of the electret layer and the substrate.

6. The vibration type touch-sensing panel of claim 1, further including a transparent film, wherein the second electrode layer is disposed on one side of the transparent film facing away from the first electrode layer, wherein the electret layer is disposed on the first electrode layer and spaced apart from the second electrode layer, the control module provides the driving voltage to generate a vibration in the transparent film and the first electrode layer.

7. The vibration type touch-sensing panel of claim 6, wherein an area of the second electrode layer is smaller than an area of the transparent film.

8. The vibration type touch-sensing panel of claim 7, each vibration unit further includes a spacer disposed between the transparent film and the substrate, wherein the spacer is connected to the transparent film and the substrate.

9. The vibration type touch-sensing panel of claim 7, each vibration unit further includes a spacer disposed between the transparent film and the substrate, wherein the spacer is fixedly connected to only one of the transparent film and the substrate.

10. The vibration type touch-sensing panel of claim 1, wherein an area of the second electrode layer is smaller than an area of the first electrode layer, or the area of the first electrode layer is smaller than the second electrode layer.

11. The vibration type touch-sensing panel of claim 1, wherein at least one of the first electrode layer and the second electrode layer forms an electrode frame and encloses a rectangular region.

12. The vibration type touch-sensing panel of claim 1 further including a translucent filler layer disposed between the electret layer and one of the first electrode layer and the second electrode layer.

13. The vibration type touch-sensing panel of claim 1, wherein one of the first electrode layer and the second electrode layer includes a vibration electrode and a sensing electrode parallel with each other.

14. The vibration type touch-sensing panel of claim 13, wherein the vibration electrode forms a frame and encloses the sensing electrode.

15. The vibration type touch-sensing panel of claim 13, wherein the sensing electrode forms a frame and encloses the vibration electrode.

16. The vibration type touch-sensing panel of claim 1, further including:
a sensing panel having a plurality of sensing units corresponding to the vibration units; and
a sensing module electrically connected to the sensing panel and receiving a sensing signal from at least one of the sensing units;
wherein the control module provides the driving voltage to a corresponding one of the vibration units based on the sensing signal.

17. The vibration type touch-sensing panel of claim 1, wherein the first electrode layer and the second electrode layer together form a sensing unit, the control module includes a sensing module connected to the sensing unit and receives a sensing signal from the sensing unit, the control module provides the driving voltage to a corresponding one of the vibration units based on the sensing signal.

18. The vibration type touch-sensing panel of claim 1, further including a sensing module electrically connected to the control module, wherein the first electrode layer and the second electrode layer together form a sensing unit, the sensing unit is connected to the sensing module and transmits a sensing signal to the sensing module, the control module provides the driving voltage to a corresponding one of the vibration units based on the sensing signal.

19. The vibration type touch-sensing panel of claim 18, further including a switching unit, the sensing module and the control module are connected to the switching unit and then to the sensing unit and the vibration unit through the switching unit.

20. The vibration type touch-sensing panel of claim 1, wherein the control module includes a first unit and a second unit, the first unit is electrically connected to the first electrode layers and the second unit is electrically connected to the second electrode layers.

21. The vibration type touch-sensing panel of claim 1, wherein the second electrode layers together form a bias electrode layer, the control module is electrically connected to the first electrode layers and generates the driving voltage by supply driving electrical potential.

22. A display device, comprising:
a display panel; and
the vibration type touch-sensing panel of claim 1 disposed on the display panel.

23. The display device of claim 22, wherein the display panel includes a display substrate used as the substrate of the vibration type touch-sensing panel.

24. The display device of claim 22, wherein the display panel includes a backside substrate and a thin-film transistor layer disposed on the backside substrate, the backside substrate is used as the substrate of the vibration type touch-sensing panel, the first electrode layer of each vibration unit is disposed in the thin-film transistor layer.

* * * * *